(12) United States Patent
Rieth

(10) Patent No.: US 9,802,285 B2
(45) Date of Patent: Oct. 31, 2017

(54) DEVICE FOR HOLDING A MILLING AND/OR GRINDING MACHINE

(71) Applicant: Stephan Rieth, St. Wendel (DE)

(72) Inventor: Stephan Rieth, St. Wendel (DE)

( * ) Notice: Subject to any disclaimer, the term of this patent is extended or adjusted under 35 U.S.C. 154(b) by 0 days.

(21) Appl. No.: 14/440,998

(22) PCT Filed: Nov. 7, 2013

(86) PCT No.: PCT/DE2013/100376
§ 371 (c)(1),
(2) Date: May 6, 2015

(87) PCT Pub. No.: WO2014/071923
PCT Pub. Date: May 15, 2014

(65) Prior Publication Data
US 2015/0290757 A1    Oct. 15, 2015

(30) Foreign Application Priority Data

Nov. 7, 2012  (DE) ........................ 10 2012 110 681

(51) Int. Cl.
| | |
|---|---|
| *B24B 23/08* | (2006.01) |
| *B23Q 9/00* | (2006.01) |
| *B23C 3/12* | (2006.01) |
| *B23B 5/16* | (2006.01) |
| *B24B 9/00* | (2006.01) |
| *B23Q 9/02* | (2006.01) |

(52) U.S. Cl.
CPC ............ *B23Q 9/0021* (2013.01); *B23B 5/162* (2013.01); *B23B 5/163* (2013.01); *B23B 5/168* (2013.01); *B23C 3/122* (2013.01); *B23Q 9/02* (2013.01); *B24B 9/007* (2013.01); *B24B 23/08* (2013.01); *B23B 2270/205* (2013.01)

(58) Field of Classification Search
CPC .......... B24B 23/00; B24B 23/08; B24B 23/02
USPC .............................. 451/359, 63, 439, 51, 344
See application file for complete search history.

(56) References Cited

U.S. PATENT DOCUMENTS

| | | |
|---|---|---|
| 3,164,062 A | 1/1965 | Hogden et al. |
| 3,553,904 A | 1/1971 | Wallace |
| 3,613,320 A * | 10/1971 | Mighton .................. B23B 5/16 451/51 |
| 3,712,174 A | 1/1973 | Granfield |
| 4,180,358 A | 12/1979 | Uribe |
| 5,076,025 A | 12/1991 | Reeble |
| 5,884,379 A | 3/1999 | Lombardi |
| 2003/0068206 A1 | 4/2003 | Bortoli |

(Continued)

FOREIGN PATENT DOCUMENTS

| | | |
|---|---|---|
| DE | 102004031756 A1 | 1/2006 |
| EP | 1295659 A1 | 3/2003 |
| FR | 2802134 A1 | 6/2001 |

(Continued)

*Primary Examiner* — Robert Rose
(74) *Attorney, Agent, or Firm* — Lucas & Mercanti, LLP

(57) ABSTRACT

A device for holding a milling and/or grinding machine, particularly hand-held milling and/or grinding machine, in a position for machining an edge at one end of a pipe. The holder device includes at least one rotatable roller which can be laid against the pipe inner side or the pipe outer side and by which a connecting part of the holder device, on which the milling and/or grinding machine can be arranged, may be moved along the edge.

20 Claims, 13 Drawing Sheets

(56) References Cited

U.S. PATENT DOCUMENTS

2008/0045126 A1    2/2008  Rieth

FOREIGN PATENT DOCUMENTS

| JP | 2002052402 A | 2/2002 |
|----|--------------|--------|
| WO | 2005095052 A1 | 10/2005 |
| WO | 2006119548 A1 | 11/2006 |
| WO | 2007122351 A2 | 11/2007 |

* cited by examiner

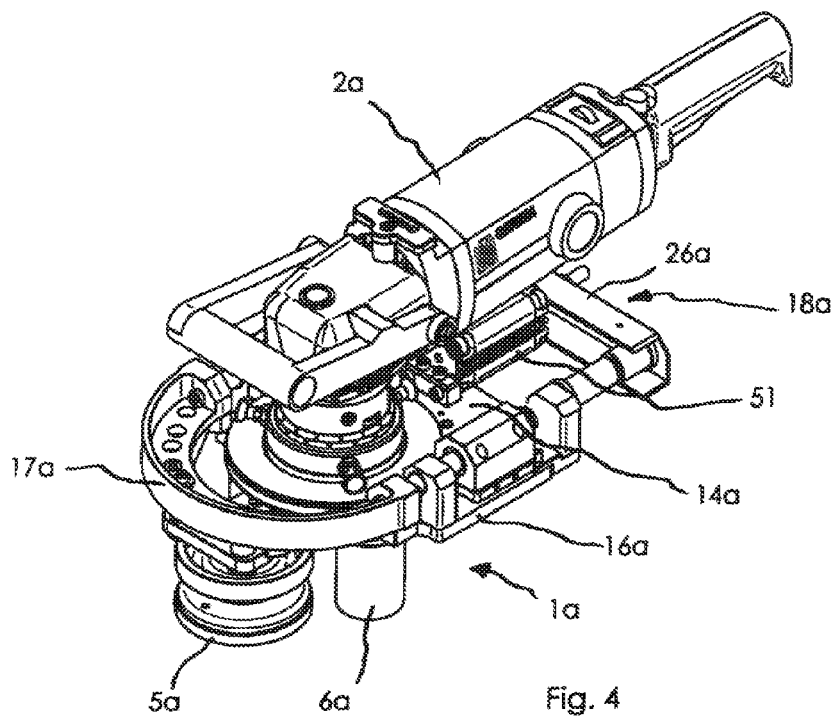
Fig. 4
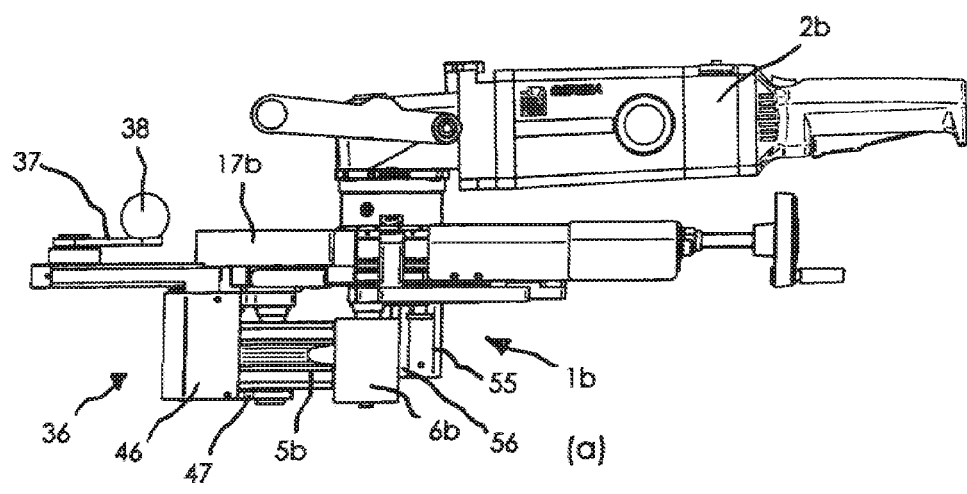
(a)
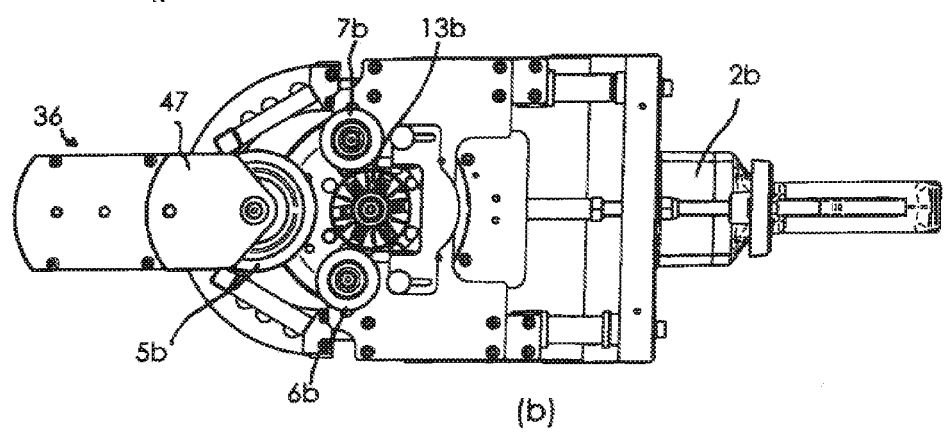
(b)
Fig. 5

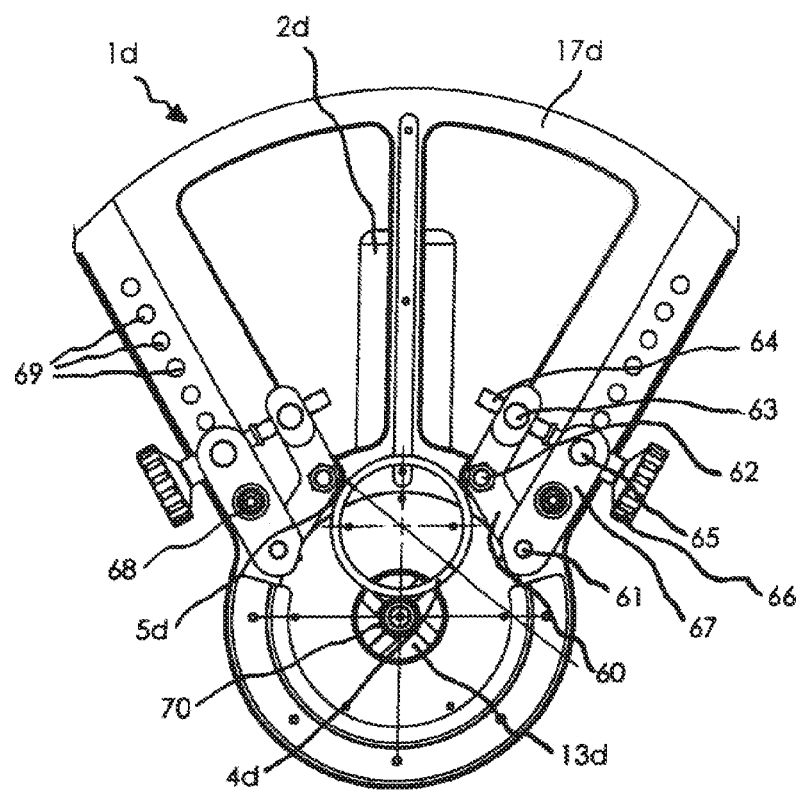
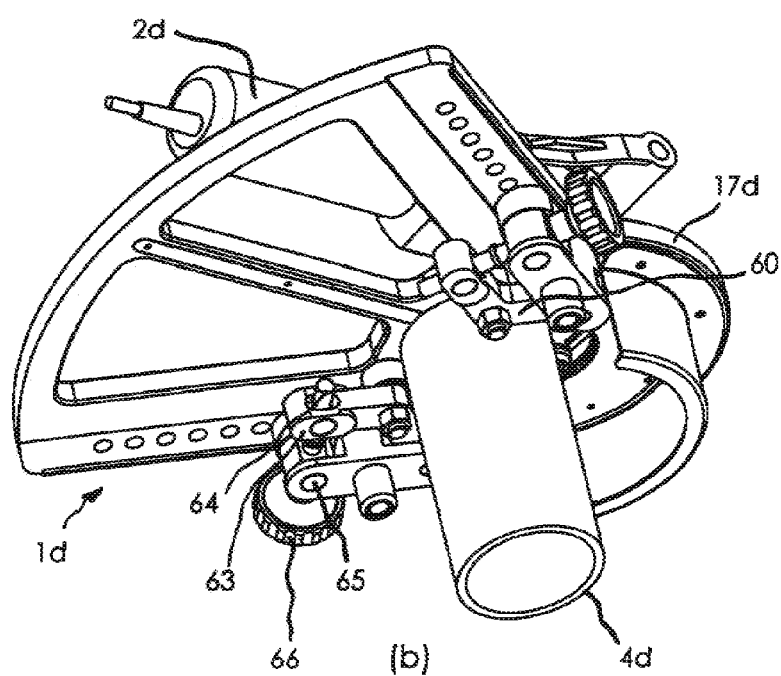
Fig. 7

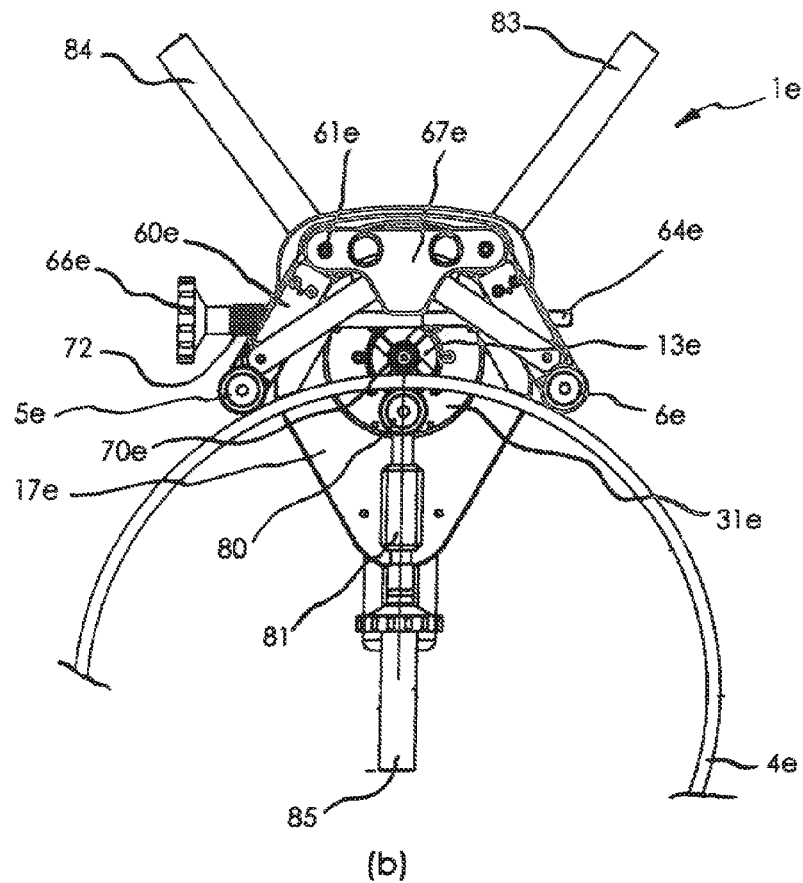
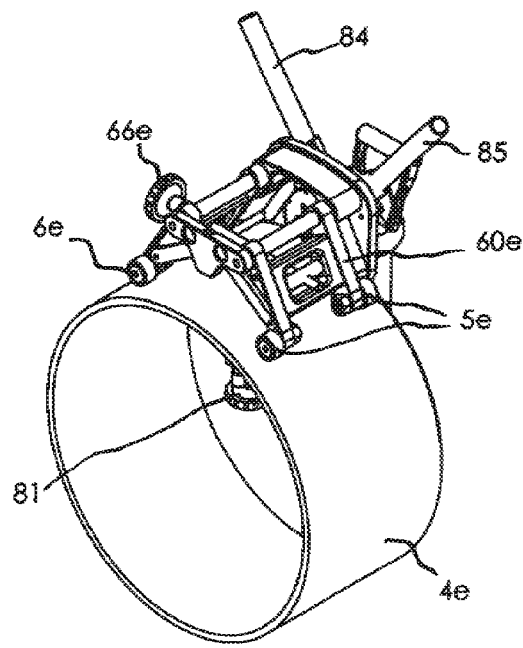
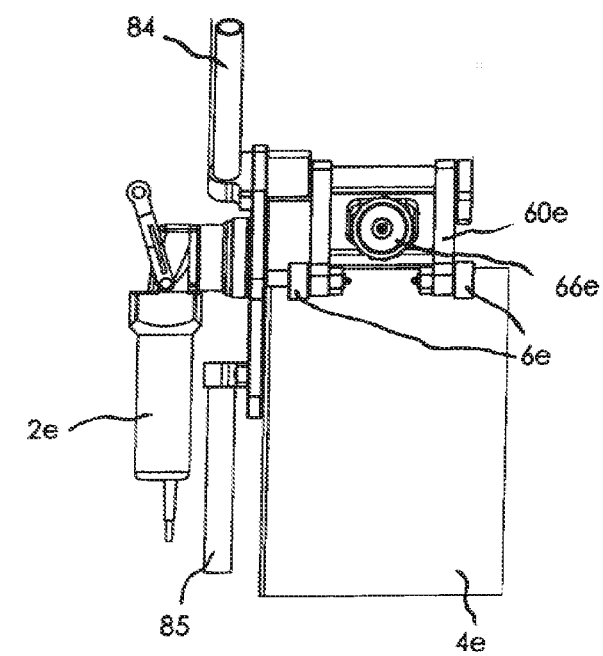
Fig. 9

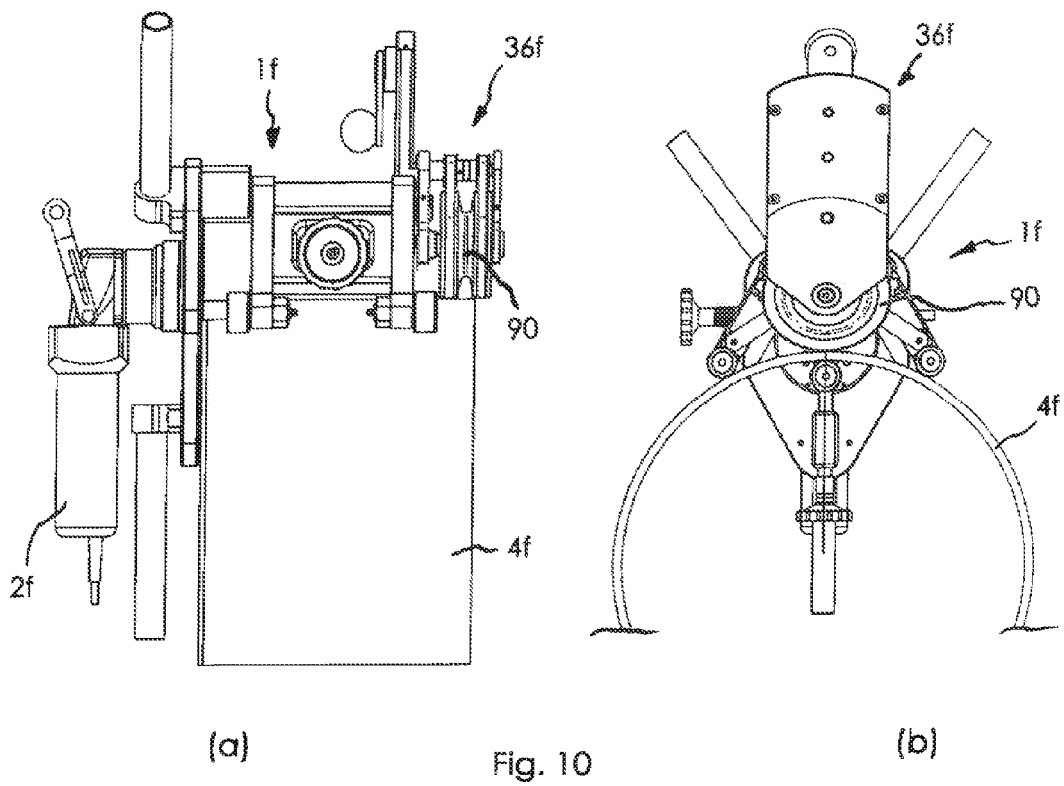
(a)     Fig. 10     (b)
(a)     Fig. 11     (b)

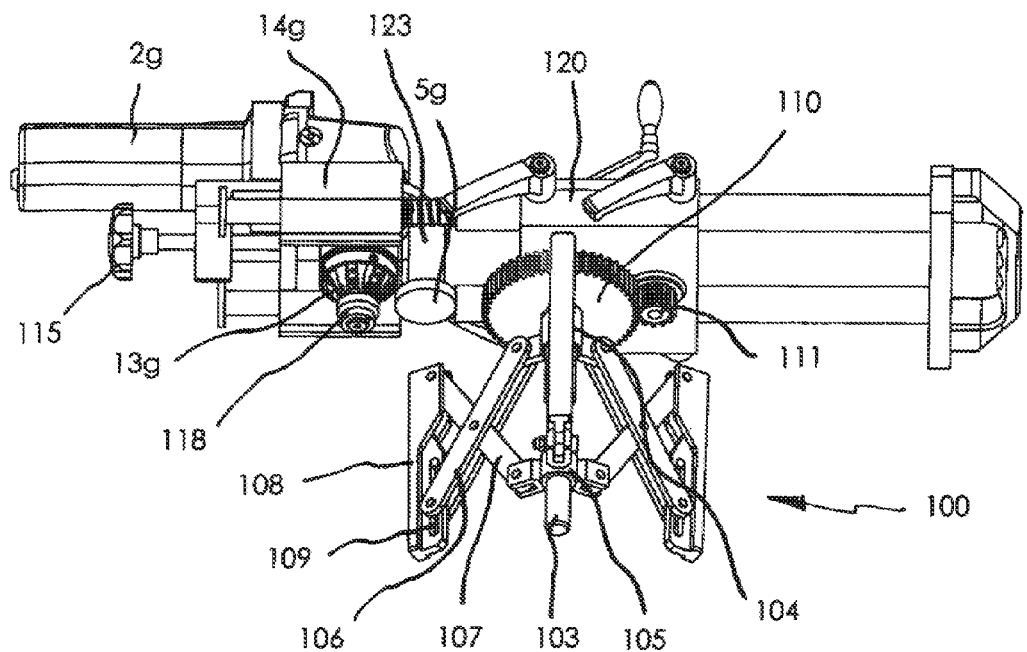
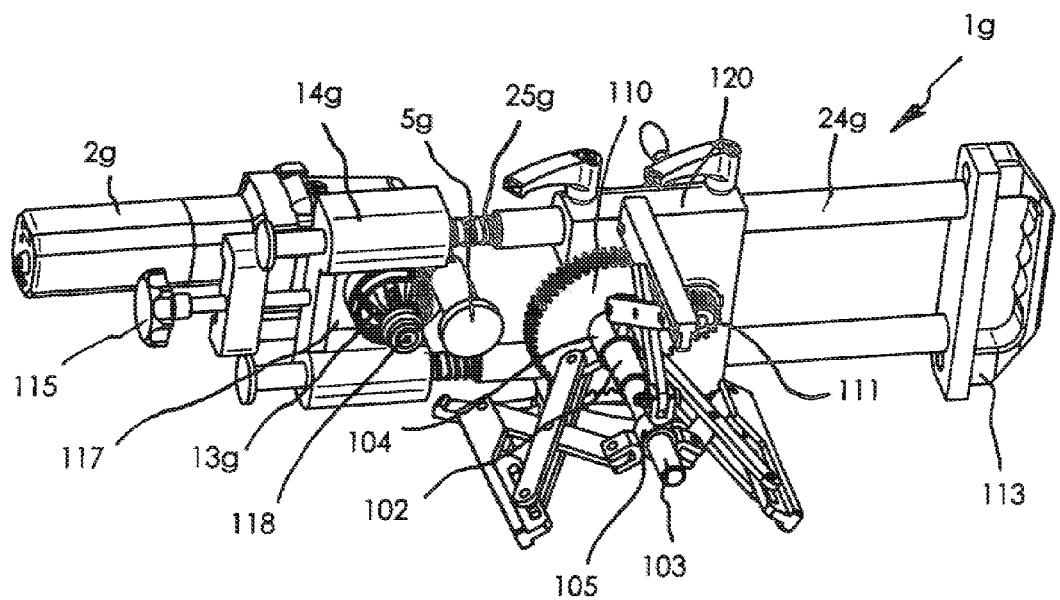
Fig. 13

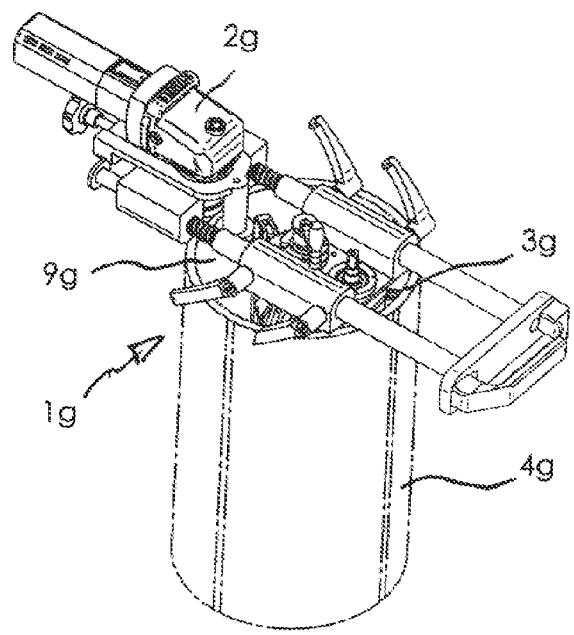
(a)
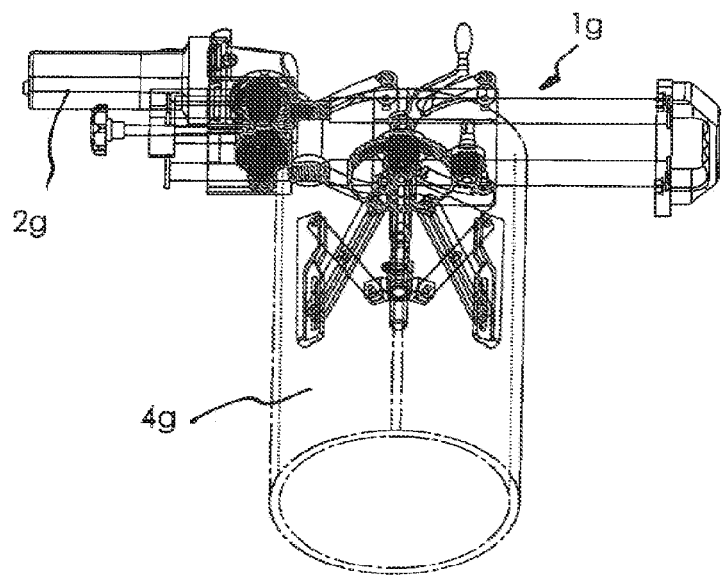
(b)
Fig. 14

DEVICE FOR HOLDING A MILLING AND/OR GRINDING MACHINE

The present application is a 371 of International application PCT/DE2013/100376, filed Nov. 7, 2013, which claims priority of DE 10 2012 110 681.9, filed Nov. 7, 2012, the priority of these applications is hereby claimed and these applications are incorporated herein by reference.

BACKGROUND OF THE INVENTION

The invention pertains to a device for holding a milling and/or grinding machine, especially a hand-held milling or grinding machine, in a position for machining an edge at one end of a pipe.

WO 2007/122351 A1 and FR 2802134 describe stationary milling devices with a stationary part, on which the pipe is clamped, and a rotatable part, which is supported on the stationary part and on which the milling machine is mounted. To machine the pipe, the milling machine is moved along the edge by means of the rotatable part under guidance of the milling head of the milling machine.

SUMMARY OF THE INVENTION

The invention is based on the goal of creating a device of the type indicated above which can be handled more easily and is more flexible.

According to the invention, this goal is achieved in that the holder device comprises at least one rotatable roller, which can be placed against the inside or outside surface of the pipe, and by means of which a connecting part of the holder device, on which the milling and/or grinding machine is to be mounted, can be moved along the edge.

To machine the edge, the roller is placed against the pipe, and the holder device is then moved along the edge of the pipe. As this is being done, the holder device is supported on the pipe and serves as a guide as the milling and/or grinding machine is moved along the edge. It is advantageous that the holder device can hold the milling or grinding head of the milling and/or grinding machine at a constant distance from edge, as a result of which it becomes especially easy to machine the edge uniformly and precisely when chamfers, for example, are to be formed or when the edges are to be ground off. In addition, the pipe bears the weight of the holder device. This turns out to be especially advantageous during the machining of the edge by means of a hand-held milling and/or grinding machine. Because there is no longer any need to exert force to hold the holder device and in particular to hold the milling and/or grinding machine, the work becomes much easier. It is advantageous that the holder device can be made relatively small and light in weight, which means that the invention creates an easily transportable device, which can be put to work quickly and easily and which can be combined especially effectively with the previously mentioned hand-held milling and/or grinding machine. The holder device is therefore especially well-adapted to use with portable milling and/or grinding machines. It is obvious that the holder device is especially well adapted to the machining of pipes with a round, especially with a circular, cross section.

It is advisable for the holder device to comprise at least two rollers and for the rollers to be placeable simultaneously against the inside and/or outside surface of the pipe. The holder device is preferably provided in such a way that the rollers can be placed simultaneously only on the inside of the pipe, only on the outside of the pipe, or on the inside and on the outside of the pipe. An especially stable mounting of the device on the pipe can be achieved in that, when the rollers are placed on the pipe, two of the rollers are provided at least on the inside or at least on the outside of the pipe.

In one embodiment of the invention, the device comprises an additional support roller, to be arranged on the milling head or on the grinding head; this support roller is rotatable around a rotational axis which is coaxial to the rotational axis of the milling head or of the grinding head and can be used to support the device on the pipe. The support roller is advisably arranged on the side of the milling head or of the grinding head facing away from the side of the milling head or of the grinding head on which a shaft of the milling and/or grinding machine supporting the milling head or grinding head is mounted.

In one embodiment of the invention, the distance between the rollers is adjustable. The holder device can thus be adapted to the diameter and thickness of the pipe to be machined. Especially when the distance between the rollers is continuously variable, the rollers can be tensioned against each other when arranged on the pipe.

In an especially preferred embodiment of the invention, the holder device comprises a mechanism for adjusting the position of the rollers. This mechanism can be operated by hand; by a motor, preferably an electric motor; or by hydraulic or pneumatic means; or it could, for example, be adjusted by means of a spindle drive.

In one embodiment of the invention, the roller adjusting mechanism comprises a lever arm, which carries at least one of the rollers and which is movable relative to the other roller or the other rollers. It is advisable to provide the lever arm with an actuating member, by means of which the roller mounted on the lever arm can be pressed against the pipe by the movement of the lever arm until both this roller and also the other roller or possibly the other rollers rest under tension against the pipe.

Alternatively or in addition, the roller adjusting mechanism can comprise at least two carrier elements mounted on a slide of the holder device, on each of which elements at least one of the rollers is mounted, the distance between the carrier elements being adjustable, preferably in linear fashion, by means of an actuating member. To mount the device on the pipe, the distance between the carrier elements is adjusted so that the rollers rest under tension against the pipe.

The roller adjusting mechanism advisably comprises an actuating spring, by means of which a force can be exerted on the rollers. For this purpose, the actuating spring is configured to exert a compressive or a tensile force on the lever arm or on the carrier elements. Depending on how the rollers are mounted on the outside or inside of the pipe, the spring is configured in such a way as to actuate the lever arm so as either to pull the carrier elements together or to push them apart so that the rollers are pressed against the pipe. In addition, it is advantageous that any irregularities on the surface of the pipe, over which the rollers travel as the edge is being machined, can be compensated by the actuating spring, which thus acts as a kind of shock absorber.

In another embodiment of the invention, the holder device comprises a mechanism for fastening it to the inside of the pipe. The fastening mechanism advantageously forms a reference point for the holder device and thus for the milling and/or grinding machine in the direction of the symmetry axis of the pipe. In addition, the holder device can be fastened easily to the pipe and will not cause any interference with the machining of the edge. One of the ways in which this is achieved is that the fastening mechanism, according to an especially preferred embodiment of the invention, grips the inside surface of the pipe a certain distance away from the edge to be machined. A milling or grinding head of the milling and/or grinding machine and the roller can therefore be moved along the inside surface and/or the outside surface of the pipe during the machining of the pipe edge without colliding with the fastening device. It is conceivable that this last-mentioned embodiment could also be provided for a device of the type in question (namely, a device for holding a milling and/or grinding machine, especially a hand-held milling and/or grinding machine, in a position for machining an edge at one end of a pipe) which is not provided with the roller according to the invention to be placed against the inside or the outside of the pipe.

The fastening mechanism is advisably set up to clamp the holder device against the inside surface of the pipe. To make it possible to machine the edge of the pipe, the holder device in one embodiment of the invention comprises means for rotating the previously mentioned connecting part, on which the milling and/or grinding machine is to be mounted, around the symmetry axis of the pipe. This rotation means preferably comprises a guide body, on which the fastening mechanism is mounted, wherein the connecting part preferably can be moved around the guide body and along the edge. The fastening mechanism advisably comprises at least two, preferably at least three, clamping elements for supporting the holder device on the inside surface of the pipe. The holder device can be easily centered in the pipe by arranging the clamping elements in such a way that they project from the guide body at the same angles to each other.

It is advisable for the clamping elements which clamp the holder device to be free to move in the radial direction, away from the guide body. For this purpose, the clamping elements can be extended or pivoted outward from the guide body. They preferably comprise a parallel guide linkage; a scissors type tensioner; an expanding lever frame, which is preferably actuatable by means of a guide body acting on one side of the lever, the other side of the lever being positionable against the inside surface of the pipe; and/or a linear motor for extending a clamping member.

So that the fastening mechanism can be centered in the interior of the pipe, the fastening mechanism is advisably set up in such a way that support members of the clamping elements to be positioned against the inside surface of the pipe are always arranged at the same radial distance from the guide body regardless of their position.

In one embodiment of the invention, the holder device is configured to position the roller on the pipe under tension. This guarantees that, as the milling machine is milling the edge, it is always kept at the same distance from the side of the pipe on which the roller is resting.

To apply the tension between the fastening mechanism and the roller, a spring is advisably provided, by means of which the roller can be pushed against the pipe. The spring is preferably provided between a carrier element, to which the fastening mechanism is attached, and the connecting part, on which the roller is mounted.

The holder device advisably comprises a connecting part, on which the milling and/or grinding machine can be attached to the holder device and which for this purpose is provided with appropriate attachment means.

In the preferred embodiment of the invention, the distance between the previously mentioned slide and the connecting part is adjustable. By changing this distance, it is possible to regulate how much material is removed as the edge is being machined.

In another embodiment of the invention, the position of the milling head or grinding head to be mounted in the holder device is adjustable in the direction of the rotational axis of the milling head or grinding head and/or perpendicular to that axis. The amount of material to be removed by means of a milling head or grinding head, e.g., the size of a chamfer, can also be changed by adjusting the position of the milling head or grinding head. To adjust the position of the milling head or grinding head in the direction of the rotational axis, the position of the connecting part in relation to a housing of the milling or grinding machine can be adjusted. In one embodiment, the connecting part for this purpose is connected to the milling and/or grinding machine by means of a thread, which makes it possible to change the position of the head.

An especially advantageous feature of the possibilities cited above is that, at the start of machining, the holder device can first be arranged in its final working position on the pipe, and the milling head or grinding head can already be removing material from the edge as it is then advanced into its own working position intended for final machining, at which point it can then be guided along the edge.

In the preferred embodiment of the invention, the previously mentioned actuating member is provided both to adjust the distance between the carrier elements and to adjust the distance between the previously mentioned slide and the connecting mechanism. The actuating member offers the advantage that the device can be placed under tension on the pipe first and that the milling or grinding head can then be brought into the machining position. For this purpose, it is advisable to provide adjusting springs between the carrier elements and also between the slide and the connecting mechanism, which springs act with different forces on the carrier parts, i.e., on the slide and on the connecting mechanism. As a result, the goal is achieved that, upon actuation of the actuating member and the concomitant flexure of the adjusting spring between the carrier parts, the rollers are first pressed against the pipe, and only then is the milling or grinding head brought into the machining position under flexure of the adjusting spring between the slide and the connecting mechanism.

It is obvious that the device can be moved along the edge by hand and that the device could be provided with separate handles for this purpose.

The machining of the edge by the device is made much easier, however, if a drive is provided for at least one of the rollers to move the device along the edge. Whereas it would be conceivable to provide a separate motor as a drive, the device in the preferred embodiment of the invention is provided with a hand-operated crank. During the machining of the edge by means of the device equipped with the hand-held milling and/or grinding machine, the hand-held milling and/or grinding machine is held by its handle with one hand, and the crank is operated by the other hand. Providing an on-off switch for the hand-held milling and/or grinding machine on the handle or near the handle offers the advantage that the hand-held milling and/or grinding machine can be easily started and stopped. As a result, the device can be operated more safely. Alternatively, a separate motor, preferably an electric motor, can be provided to drive the roller.

In another embodiment of the invention, a belt or a chain can be provided as a drive for moving the device, this belt or chain wrapping around the pipe at one end and around a drive roller of the holder device at the other. By turning the roller, the device can be pulled around the pipe on the belt or chain.

In the preferred embodiment of the invention, the milling and/or grinding machine is mounted rotatably in the holder device, preferably rotatable around the same axis as that of the milling head or grinding head of the milling and/or grinding machine. It is advantageous in this case that, while the milling device is moving in a circle as the edge is being machined, the milling and/or grinding machine itself does not have to be rotated concomitantly. Instead, the milling and/or grinding machine rotates versus the holder device automatically during the execution of the circular movement. It thus becomes very easy to move the milling and/or grinding machine, because, although the circular movement is performed by the milling head or grinding head, the milling and/or grinding machine itself always has the same orientation in space. It is then advantageous that it is not necessary to grip the handles of the device by hand, in particular the handles of the milling and/or grinding machine, or to grip between one of the handles of the milling and/or grinding machine and the hand crank in order to machine the entire edge.

It is advisable to provide a rotary bearing, thus permitting rotational movement, on a tubular-shaped housing part of the milling and/or grinding machine, which tubular part surrounds a shaft carrying the milling or grinding head.

The invention is explained in greater detail below on the basis of exemplary embodiments and the attached drawings, which refer to these examples:

BRIEF DESCRIPTION OF THE DRAWING

FIG. 4 shows another perspective view of a device according to the invention;

FIG. 7 shows various views of another device according to the invention;

FIG. 10 shows various views of another device according to the invention;

FIG. 11 shows the device according to FIG. 1 in various working positions on a pipe;

FIG. 13 shows various views of the device according to FIG. 12; and

FIG. 14 shows various views of the device according to FIG. 1 in a working position on a pipe.

DETAILED DESCRIPTION OF THE INVENTION

Figure 1:
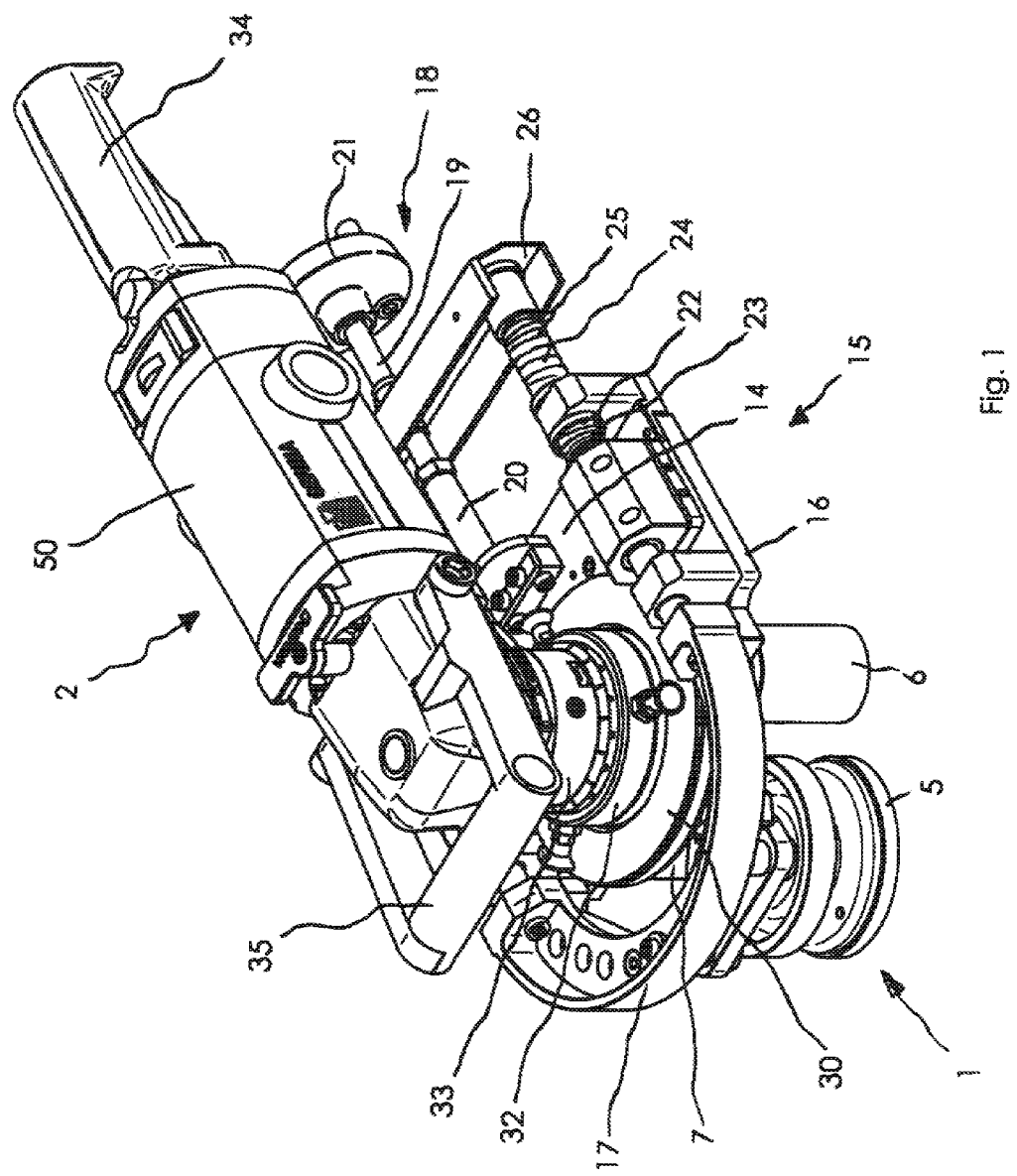
FIG. 1 shows a perspective view of the device according to the invention.
Figure 2:
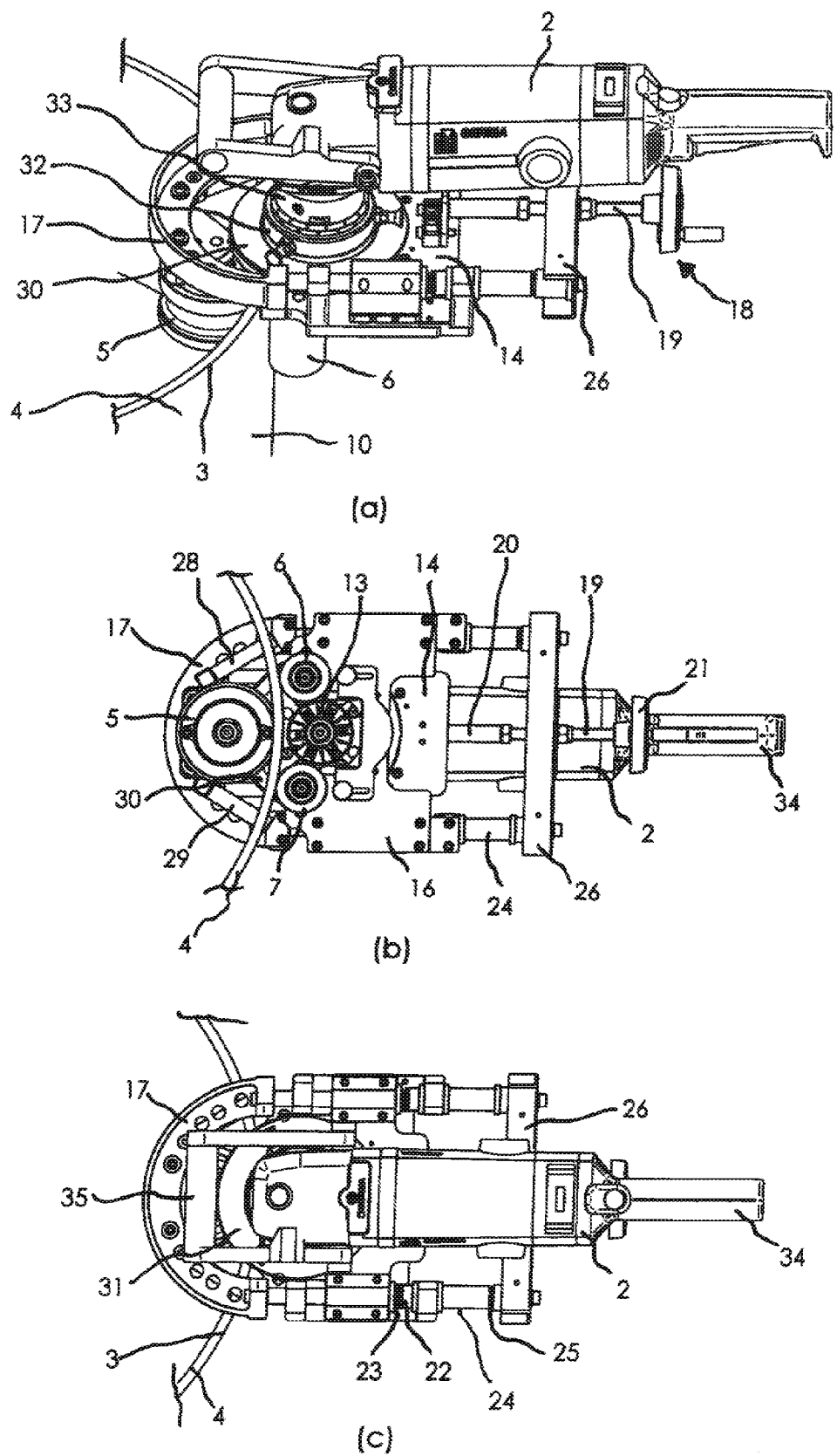
FIG. 2 shows additional views of the device according to FIG. 1.

FIGS. 1 and 2 show a holder device 1 according to the invention for a hand-held milling machine 2.

A housing 50, holding the drive of the hand-held milling machine 2, is provided between two handles 34, 35 of the hand-held milling machine 2. A shaft (not shown here), which carries the conical milling head 13 shown in FIG. 2b, is connected to the drive of the hand-held milling machine 2 by a set of gears. A tubular housing section 32 is provided around the shaft; a support ring 30 is arranged at the bottom end of this tubular section. The tubular housing section 32 is arranged height-adjustably on another tubular section 33 permanently connected to the housing 50, so that the position of the support ring 30 in relation to the milling head 13 can be changed.

The tubular housing section 32 and the tubular section 33 can be connected to each other by a thread, so that the position of the milling head 13 relative to the holder device 1 can be changed by turning the tubular housing section 32 versus the tubular section 33.

The connecting part 14 of the holder device 1 is connected to the tubular housing section 32. As can be seen in FIGS. 3a and 3b on the basis of different shadings, the milling machine 2 and the connecting part 14 together form a unit C.

On the connecting part 14 a spindle is mounted, which comprises a tube 20 provided with an internal thread, in which a rod 19 is arranged, this rod being provided with a thread, which engages with the internal thread in the part of the threaded tube 20 through which the rod passes. A rotatable handle 21 is provided at the end of the rod 19. Approximately in the middle, the rod 19 is supported rotatably in a bushing 27, which is connected to a connecting bar 26. The spindle can be configured as a ball screw (ball-type linear drive), wherein the rod 19 is configured as the ball screw and the internal thread of the tube 20 as the internal thread of the drive.

The connecting bar 26 is movably connected at both ends to a carrier part 16 of a slide 15 by coil springs 25; the slide carries the rollers 6, 7. The connecting bar 26 is connected to the carrier part 16 by the tubes 24, one end of which is fastened to the connecting member 26, whereas the other end is connected to the carrier part 17, both of which are arranged around the tubes 24.

The carrier element 16 and the rollers 6, 7 together form the unit B, shown by the shading in FIGS. 3a and 3b.

The carrier element 16 is movably connected to another carrier element 17, on which a roller 5 is mounted, this connection being established by way of bushings 22, which are movably seated on the tubes 24 and springs 23, which act with less force than the springs 25 and which are also arranged on the tube 24.

As can be seen especially clearly in FIG. 2b, furthermore, support rollers 28, 29 are provided on the carrier element 17; the rotational axes of these rollers are perpendicular to those of the rollers 5, 6, 7. As can be seen in FIGS. 3a and 3b, the carrier element 17, the roller 5, the support rollers 28, 29, the tubes 24, the rod 19, and the connecting bar 26 form a unit A.

To machine an edge 3 of a pipe 4, the holder device 1 is set up in such a way that the rollers 5, 6, 7 can grip the edge 3 between them and the support rollers 28, 29 can rest on the edge 3.

Then the rotatable handle 21 is actuated against the force of the springs 23, so that unit A is shifted versus unit B to such an extent that the roller 5 is seated under tension on the inside surface 9 and the rollers 6, 7 are seated under tension on the outside surface 10 of the pipe 4.

Then the milling machine 2 is turned on, so that the milling head 13 rotates, and the unit C is moved by rotating the rotatable handle 21 against the first springs 25 to such an extent that the milling head 13 begins to produce a chamfer of the intended size on the edge 3. In the final working position, the rod 19 is fixed in its position in the tube 20.

Then the device is moved around the pipe 4 along the edge of the pipe 4, wherein the rollers 5, 6, 7 and the support rollers 28, 29 roll along the pipe 4, and the chamfer is introduced on the edge 3 around the entire circumference of the pipe 4.

To remove the device, the rod 19 is loosened from its tightened position. The spring 23 first presses the milling head 13 away from the edge, wherein the rod 19 rotates in the threaded tube 20. In addition, the spring 25 pushes the units A and B apart, so that the rollers 5, 6, 7 no longer rest under tension on the pipe 4 and the device can be lifted from the pipe 4.

It is advantageous that the device can be supported on the pipe 4 as the edge 3 is being machined. The pipe thus bears the weight of the device. This is advantageous especially in cases where the axis of the pipe is arranged horizontally during machining. In addition, the holder device 1 forms a guide for the milling machine 2, so that a chamfer of constant size can be produced easily along the entire edge 3.

Figure 3:
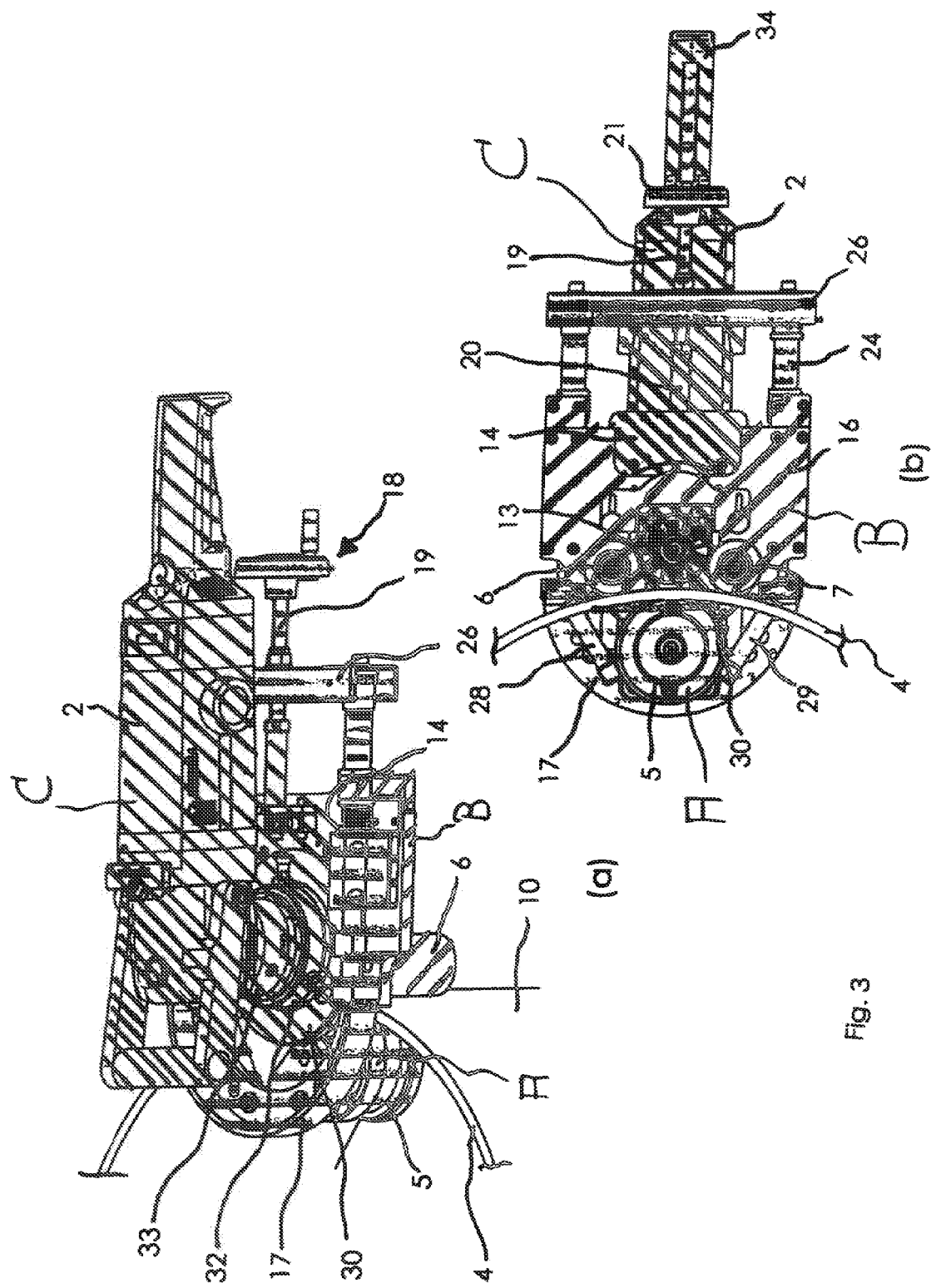
FIG. 3 shows various views of the device according to FIG. 1, wherein components on the device are shaded in different way to identify their functions.

In one embodiment of the device according to FIGS. 1-3, the connecting part 14 is rotatable around the same rotational axis as that around which the milling head 13 is also rotatably supported. For this purpose, the support ring 30 is rotatably supported on the tubular housing section 32.

It is advantageous that the holder device 1 can rotate relative to the milling machine as the milling head 13 is being guided along the edge 3. The milling machine 1 can then always remain pointed in the same direction as the milling head 13 is being guided around the circumference. FIG. 11 shows the device in various positions of the holder device 1 relative to the milling machine 2. As a result, the machining of the edge 3 is made much simpler, because there is no longer any need to grip the handles 34, 35 with the hands as the device is being guided around the pipe.

In another exemplary embodiment, not shown here, an electric motor is provided to rotate the rod 19 and thus to adjust the position of the holder device.

Reference will now be made to FIGS. 4-14, where the same or similarly acting parts are designated by the same reference number as those used in FIGS. 1-3, a letter being added to each of the reference numbers in question.

The device according to the invention as shown in FIG. 4 differs from that according to FIGS. 1-3 in that an adjusting mechanism 18a is formed by a pneumatic actuating member 51, by means of which a connecting bar 26a can be pulled toward a connecting part 14a of a holder device 1a.

By actuation of the pneumatic actuating member 50, the device can be placed on the edge of a pipe as described above with respect to FIGS. 1-3. For this purpose, the pneumatic actuating member 50 can be provided with two adjustment stages, so that, as described above, first the rollers 5a, 6a, 7a are placed against the inside and outside surfaces of the pipe, and only then is the milling head (not shown here) brought up into position at the edge. The positioning of the rollers 5a, 6a, 7a and of the milling head 13a can also be conducted in a single step, however, wherein the milling head 13a is advisably turned on.

Figure 5:
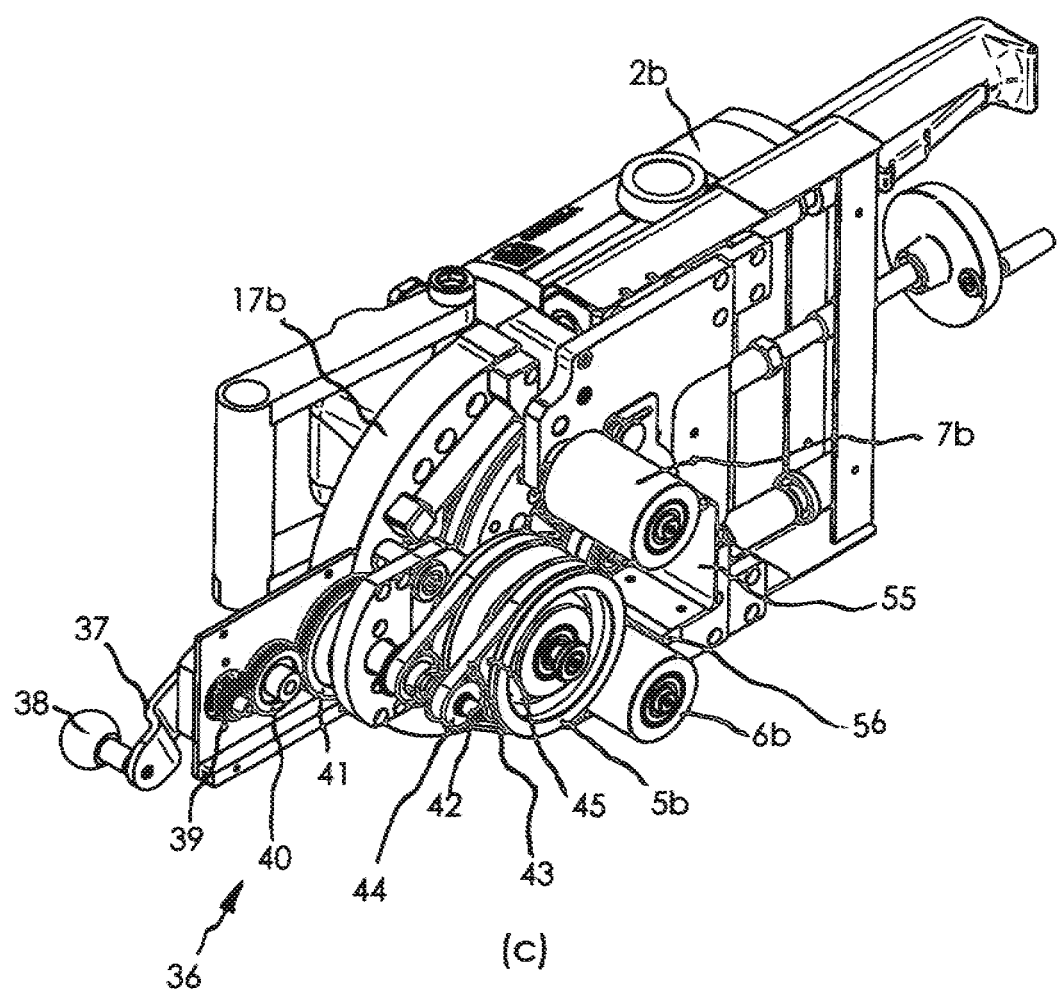
FIG. 5 shows various views of details of another device according to the invention.
Figure 6:
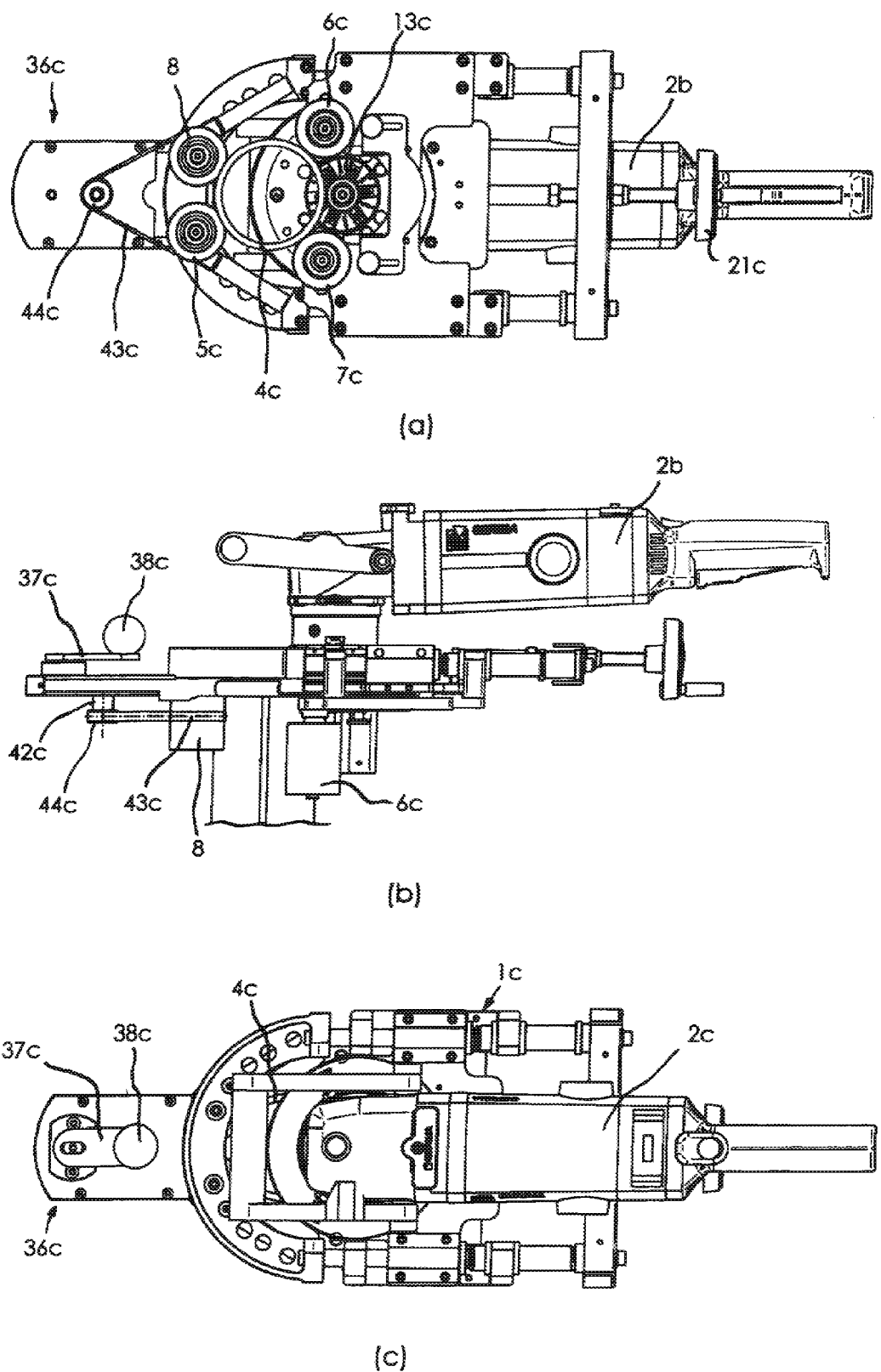
FIG. 6 shows various views of another device according to the invention.

The device according to FIG. 5 differs from that according to FIGS. 1-3 in that a drive 36 for a roller 5b of a holder device 1b is provided. The drive 36 is connected to a carrier element 17b and comprises a crank 37, which is provided with a turning knob 38.

As is especially clear from FIG. 5c, which shows the details of the drive 36, the crank 36 is connected to a gear wheel 39 by a shaft, the gear wheel being in engagement with another gear wheel 40 of larger diameter, which in turn engages with another gear wheel 41 of even larger diameter. On the gear wheel 41, a shaft 42 is mounted, which comprises drive pulleys 44, around which belts 43 are laid. The belts 43 are also laid in grooves 45 provided in the roller 5b. The crank 37 and the gear wheels 39, 40, 41 are arranged on a mounting plate 48 connected to a carrier element 17b. On the bottom side of the drive 36, a sheet-metal piece 47 is provided as a protective cover.

FIGS. 5a and 5c also show that, on the bottom side of the holder device 1b, on a side of the milling head 13b facing away from the rollers 6b, 7b, a protective plate 55 can be provided to catch the swarf which produced during milling. Projecting wire brushes 56 can be provided on the protective plate to scrape away the swarf from the rollers 6b, 7b.

To machine an edge, the device is positioned on a pipe as described above for FIGS. 1-3, and the milling machine 2b is brought into operating position. To move the device along the edge, the crank 37 is turned by means of the knob 38, and thus the roller 5b is caused to rotate, which moves the device along the pipe.

It is obvious that the devices according to FIGS. 1-6 for machining the inside edge can also be positioned on the edge of a pipe in the inverse manner; that is, the rollers 5, 5a, 5b can rest on the outside surface of the pipe 4 instead of on the inside surface.

In the case of the exemplary embodiment shown in FIG. 6a, a device according to the invention is provided with four rollers 5c, 6c, 7c, 8 instead of three. As is especially clear from FIG. 6a, this embodiment of the invention is especially well adapted to the machining of pipes of relatively small diameter. To machine the edge 3c of a pipe 4c, the rollers 5c, 6c, 7c, 8 are set down onto the outside surface of the pipe 4c under tension. For this purpose, a holder device 1c of the device is actuated in the same way as described above for FIGS. 1-3, wherein the rollers 5c, 6c, 7c, 8 are first clamped onto the outside of the pipe 3 under actuation of the rotary handle 21, and then the milling head 13c is moved along the edge of the pipe 4c.

A drive 36c for moving the device along the edge differs from that according to FIG. 5 in that a belt 43c is guided around the two rollers 5c and 8 and thus, when the crank 37c is actuated, the two rollers 5c and 8 are rotated.

Figure 8:
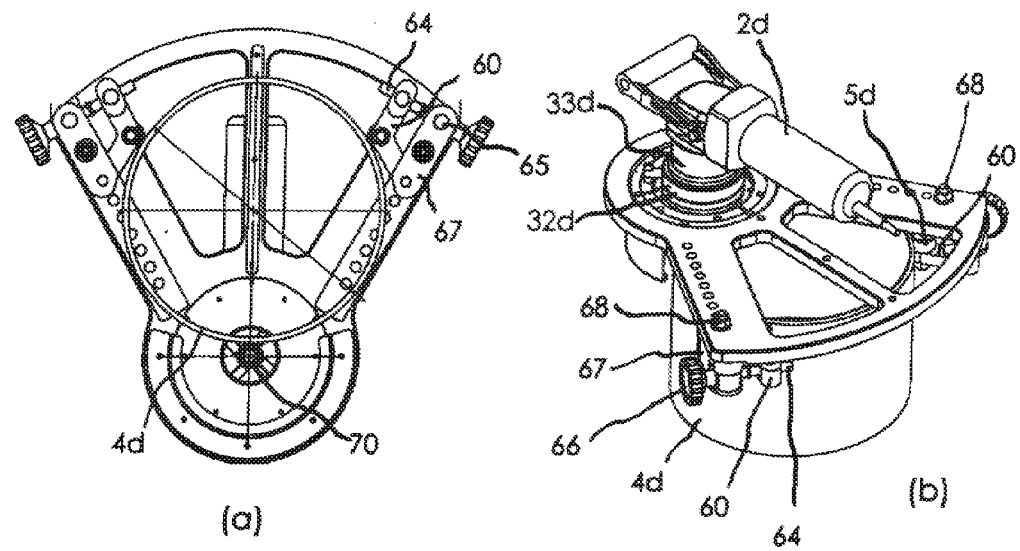
FIG. 8 shows various views of the device according to FIG. 7 in a different position.

FIGS. 7 and 8 show another device according to the invention in two different settings. The device according to FIGS. 7 and 8, which is somewhat simpler in design than the exemplary embodiments described above, comprises a holder device 1d with a carrier part 17d, on which lever mechanisms are arranged, each of which comprises an angled lever arm 60. At the angle of each lever arm 60, a roller 5d, 6c is rotatably mounted on a rotational axis 62. At one end, the lever arm 60 is mounted in a rotary bearing 61 on a mounting part 67. At the other end, a rotatably suspended socket for a threaded pin 64 is provided. The threaded pin 64, which rotates around an axis 65, is suspended by the mounting part 67 and is provided with a turning knob 66.

The mounting part 67 is provided with a bore, through which a screw 68 can be guided to fasten the mounting part 67 in one of the bores 69 in the carrier element 17d.

As is especially clear from FIGS. 7c and 8c, a roller 70 is arranged on the milling head 13d . . . a hand-held milling machine 2d of the device.

To machine the edge of the pipe 4d, the rollers 5d, 6d are brought into position by turning the knobs 66 and thus moving the lever arms 60, so that the rollers 5d, 6d, 70 grip the outside surface of the pipe 4d. Then the lever arms 60 are shifted by turning the knobs 66 of the threaded pins 64 until the rollers 5d, 6d, 70 are seated under tension against the pipe 4d. Then the milling machine 2d is turned on, so that the milling head 13d rotates; the milling head 13 is now guided to the edge by rotation of a tubular housing section 32d with respect to a tubular section 33d and thus moved down by means of the threaded joint connecting these two components.

After the edge has been machined, the holder device 1d can be removed by turning the knobs 66 to move the rollers 5d, 6d away from the pipe.

After loosening the screw 68 and moving the mounting part 67, the mounting part 7 can be moved to one of the other bores 69 to adapt the holder device 1d to pipes of different radii and wall thicknesses, as shown on the basis of the various positions of the lever mechanisms in FIGS. 7 and 8.

Figure 9:
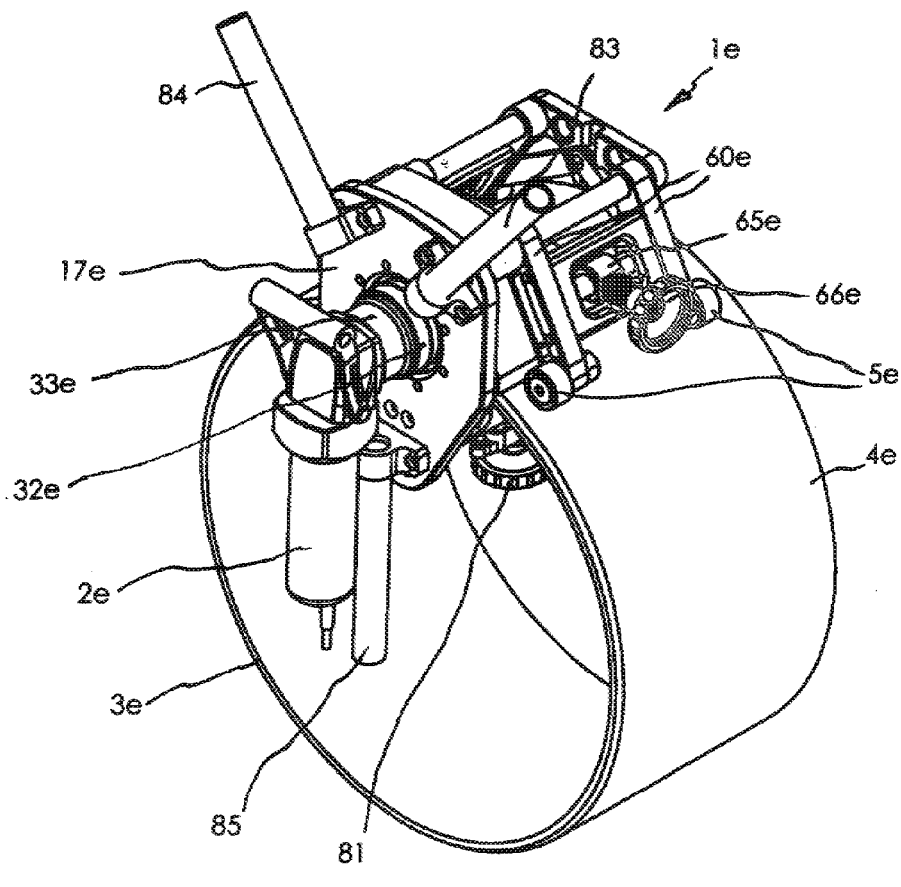
FIG. 9 shows various views of another device according to the invention.

In the case of a device according to the exemplary embodiment of FIG. 9, two lever arms 60e are provided on each side of a carrier element 17e of the holder device 1e, which is connected to a hand-held milling machine 2e; at the ends of each these lever arms is a roller 5e, 6e, designed to rest on the outside surface of a pipe 4e. The lever arms 60e are supported in a rotary bearing 61e on a mounting part 67e. Their position on the mounting part 67e can be changed by means of a threaded pin 64e, which is connected to the lever arms 60e. By turning the threaded pin 64e by means of a hand-operated knob 66e, the lever arms 60e can be pulled inward or pushed apart, as a result of which the position of the holder device 1e and thus the position of a milling head 13e relative to the pipe 4e can be changed.

As an option, an additional roller 80 can be arranged adjustably on the carrier element 17e a certain distance away from the milling head 13e; this roller is intended to rest on an inside surface of the pipe 4e. By means of an actuating member 81, the position of the roller 80 in relation to the milling head 13e can be changed.

An additional roller 70e is provided on the milling head 13e; this roller rests on the opposite side of the pipe 4e, i.e., the side opposite the side on which the roller 80 rests on the pipe 4e.

On the threaded pin 64e a spring 73 is provided, which allows the lever arms 60e to move to a certain extent with respect to each other, so that the holder device 1e can absorb certain irregularities on the surface of the pipe 4e in the manner of a shock absorber.

To machine an edge of the pipe 4e, the rollers 5e, 6e are set down on the outside surface of the pipe 4e, and the threaded pin 64e is used to bring the lever arms 60e into such a position that the roller 70e is also resting on the outside surface of the pipe 4e. Then the actuating member 81 is used to move the roller 80 against the inside surface of the pipe 4e, and thus the rollers 5e, 6e, 70e, and 80 are tensioned against the pipe. Then the holder device is lowered onto the edge of the pipe until a support surface 31e of a support ring 30e of the hand-held milling machine 2e rests completely on the edge. After that, the milling machine is adjusted and, under rotation of the milling head 13e, the milling head 13e is lowered onto the edge by turning a tubular housing section 32e versus a tubular section 33e (as described above), a certain amount of material thus being removed, and then the device is moved along the edge of the pipe 4e.

To remove the device from the pipe, the roller 80e is moved away from the inside surface of the pipe by operation of the actuating member 81.

If the device is not provided with the optional roller 80 and its actuating member 81, the device is held against only one surface of the pipe.

It is obvious that the device according to FIGS. 7-9 can also be provided with a slide 15 like that of the device according to FIG. 1. The milling head 13d, 13f is then also movable radially into a machining position relative to the milling head 13d, 13f.

FIG. 10 shows another embodiment of the invention, in which the device according to FIG. 9 is provided with a drive pulley 90 designed to be set down onto a pipe 4f, for which a crank drive 36f is provided. The crank drive is configured like the drive 36 according to FIG. 5. It is arranged on the side of a holder device 1f of the device facing away from a milling machine 2f.

In other exemplary embodiments not shown here, a conical grinding head, a cylindrical milling head, or a cylindrical grinding head can be provided in the devices according to FIGS. 1-9 instead of the conical milling head 13, 13a, 13b, 13c, 13d, 13e to machine the inside or outside surfaces of the pipe edge; or machining means such as a grinding surface or grinding plates can be provided on the base surface of the cylindrical milling head or grinding head to machine the end surface of the edge.

Figure 12:
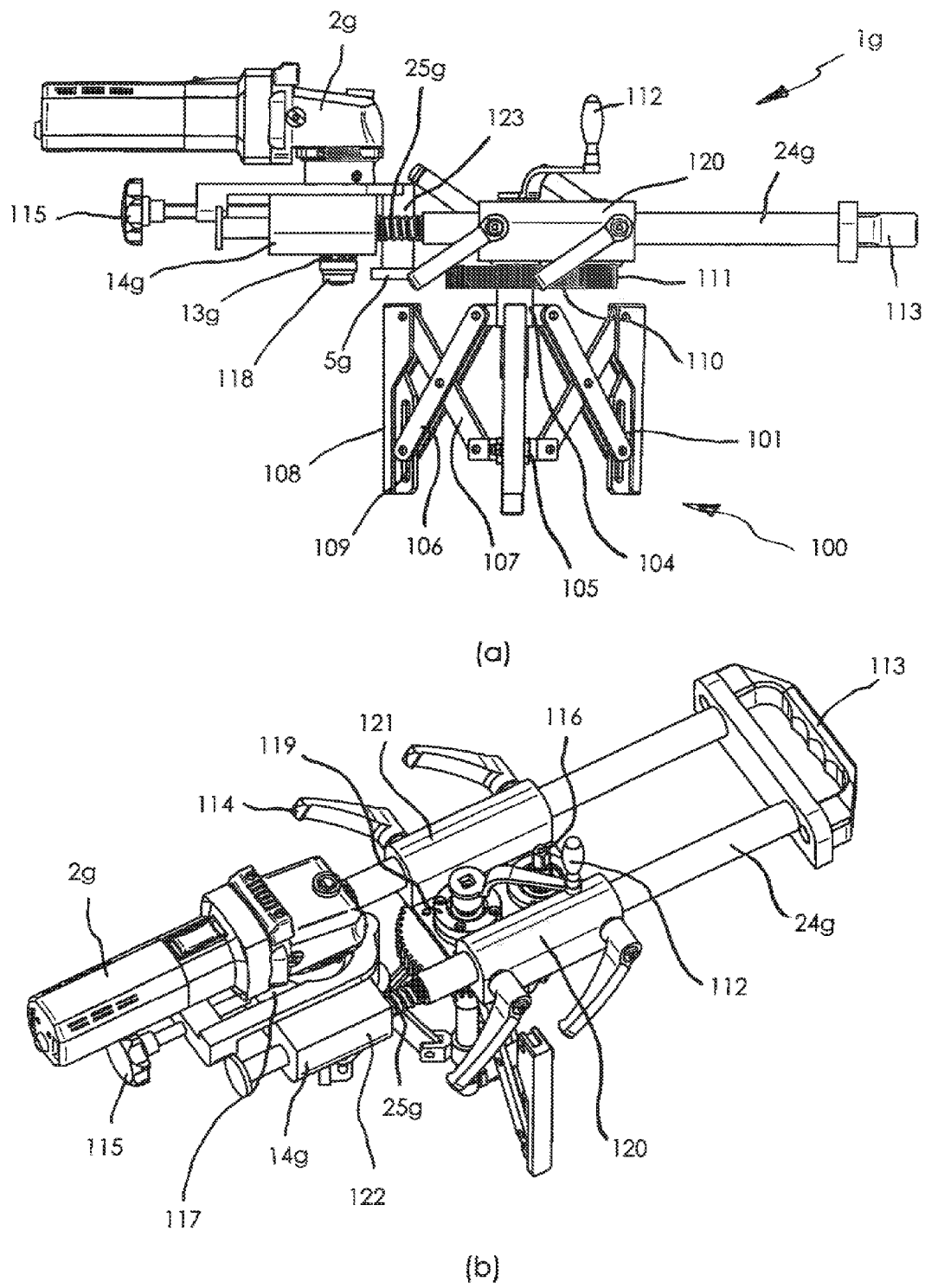
FIG. 12 shows various views of another device according to the invention.

Another holder device 1g according to the invention is shown in FIGS. 12-14. To mount the holder device 1g on an inside surface 9g of a pipe 4g of circular cross section, the holder device 1g is provided with a fastening mechanism 100. The fastening mechanism 100 comprises three scissors-type tensioners 101, which project radially from a guide body, which is formed out of a guide tube 102 and a guide rod 103 arranged movably in the guide tube 102. The ends of the legs 106 of the scissors tensioners 101 are attached by way of mounting members 104 to the guide tube 102, and the ends of the legs 107 are connected by way of mounting members 105 to the guide rod 103. In the area where the guide rod 103 is arranged in the guide tube 102, it is provided with a thread (not shown), which engages in an internal thread in the tube 102. By turning a crank 112, which can be set down onto a journal, which is provided to receive the crank 112 and which is connected to the rod 103, the guide rod 103 can be moved in such a way that it carries the attachment member 105 along with it. As a result, support members 108 of the scissors tensioners 101, which are provided for contact with the inside surface 9g of the pipe, can be moved radially as the angles between the scissor legs 106, 107 change, wherein pins at the other end of the scissors legs 106 slide in slots 109 provided in the support members 108.

The guide tube 102 is rotatably mounted on a carrier element 120 of the holder device 1g by means of a rotary bearing 119. On the bottom side of the carrier element 120, a gear wheel 110 is mounted on the guide tube 102, with which gear wheel another gear wheel 111 engages, which is rotatably supported on the carrier element 120. The gear wheel 111 is mounted on a journal 116, onto which the crank 112 can be set with a good fit. When the gear wheel 111 is turned, the gear wheel 111 migrates around the gear wheel 110, and as it does so it carries the carrier element 120 along with it, so that a rotational movement around the longitudinal axis of the guide tube 102 and of the guide rod 103 is executed.

The carrier element 120 is provided with two bearings 121, in which rods 24g are free to slide, which are connected to each other at their ends by a handle 113. Clamping screws 114, which are provided with grips and which can be used to clamp the rods 24g firmly in the bearings 121, are provided on the bearings 121.

The rods 24g, in an area on the side of the carrier element 120 facing away from the handle 113, comprise a reduced radius, wherein shoulders are formed at the transition to the smaller radius. In the area of the smaller radii, spiral springs 25g are arranged on the rods 24g. The spiral springs 25g are braced at one end against the shoulders and at the other end rest on bearing elements 122 of the connecting part 14g, which carries the milling machine 2g.

A rotatable roller 5g is held at a constant distance from an adjusting slide 117 of the connecting part 14g by way of a connecting rod 123; the position of the slide in the connecting part 14g can be adjusted in the direction of the long axes of the rods 24g by turning the knob 115 of a spindle adjuster, so that the distance between the roller 5g and the milling head 13 can be adjusted.

On the milling head 13b, a rotatable roller 118 is mounted, the rotational axis of which is coaxial to the rotational axis of the milling head 13g and which serves as a forward-feed limiter for the milling head 13g relative to the pipe.

To arrange the holder device 1g on the pipe 4g, first the clamping screws 114 are loosened, so that the rods 24g are freely movable in the carrier element 120. Then the clamping mechanism 100 is introduced into the pipe, and the rods 24g are positioned in the bearings 121 in such a way that the connecting part can be arranged on the edge so that the roller 5g rests on the inside surface 9g of the pipe and the milling head 13g rests on the edge 3g.

Then the scissors tensioner 101 is extended by turning the crank 112 until the support members 108 are so tightly pressed against the inside surface 9g of the pipe that the holder device 1g is firmly held by the fastening mechanism 100 in the pipe 4g, and the fastening mechanism maintains itself in this position.

Then, by pushing on the handle 113, the rods 24 are moved toward the milling machine 2g, so that the springs 25g are compressed and the roller 5g presses against the inside surface 9g of the pipe. In this pretensioned position, the rods 24g are fixed in place on the carrier element 120 by means of the clamping screws 114.

Then the position of the milling head 13g in relation to the roller 5g is set by turning the knob 115, the adjusting slide 117 with the roller 5g thus being shifted relative to the connecting part 14g, and thus, possibly by means of the various steps described above for the other exemplary embodiment, brought into its working position in the axial direction of the milling head 13g, possibly after the milling machine 2g has been turned on and as material is being removed.

To make a chamfer on the edge 3g of the pipe by means of the milling machine 2g, the crank 112 is now placed on the journal 116 of the gear wheel 111. By turning the crank 112 and thus the gear wheel 111, the carrier element 120 rotates together with the connecting part 122 and the milling machine 2g along the edge of the pipe 4g, wherein the roller 5g is pressed against the inside surface 9g of the pipe at all times by the springs 25g.

It is advantageous that the chamfer produced by the milling head 13g is dependent on the form of the inside surface 9g of the pipe, so that, first, any deviations of the pipe 4g from a circular cross section, and, second, any areas of thickened material which may be present as a result of, for example, welded seams, form the size of the chamfer which is produced. The advantage is thus achieved that a uniformly equal material thickness is present around the entire circumference of the pipe 4g at the edge 3g. This is advantageous for the welding work to be performed later on the edge 3g.

It is obvious that, to produce a chamfer on the inside surface of a pipe, the connecting part 14g could be arranged in a position which is the inverse of that shown in FIGS. 12, 13, and 14; that is, the roller 5g could be on the outside surface of the pipe 4g, and the milling head 13g could be on the inside surface 9g. In this case, the springs 25g, however, would have to be connected by their ends to the rods 24g or the connecting part 14g so that they can be subjected to tensile force.

In an embodiment not shown here, the position of the guide tube 102 in relation to the carrier element 120 is adjustable in the direction of the longitudinal axis of the guide tube 104, so that the position of milling machine 2g or of the milling head 13g can be adjusted in the direction of the longitudinal axis of the pipe 4g. For this purpose, the rotary bearing 119 can be supported by way of a thread in the carrier element 120 and locked in various positions there.

All of the parts, components, and structural units of the devices described, illustrated, and explained above can be combined with each other to form additional devices according to the invention.

The invention claimed is:

1. A device for holding a milling and/or grinding machine in a position for machining an edge at one end of a pipe, the device comprising: at least one rotatable roller placeable against an inside surface or an outside surface of the pipe; and a connecting part on which the milling and/or grinding machine is mountable, the connecting part being movable along the edge by the rotatable roller; and a bearing that mounts the milling and/or grinding machine in relation to the device so as to be rotatable around an axis in common with a milling head or a grinding head of the milling and/or grinding machine to be mounted in the device and so as to simultaneously be fixed in a direction of the axis.

2. The device according to claim 1, further comprising an adjusting device for arranging the at least one rotatable roller under tension on the pipe.

3. The device according to claim 2, wherein the adjusting device for arranging at least two of the rollers under tension, wherein a distance between the rollers is adjustable by the adjusting device.

4. The device according to claim 3, wherein the adjusting device has a lever arm that carries at least one of the rollers and is movable in relation to the other roller or other rollers.

5. The device according to claim 3, and further comprising a slide, wherein the adjusting device has at least two carrier elements arranged on the slide, at least one of the rollers being mounted on each of the carrier elements so that a distance of the rollers from each other is adjustable.

6. The device according to claim 5, wherein a distance between the slide and the connecting part is adjustable.

7. The device according to claim 1, further comprising a mechanism for fastening the device to the inside surface of the pipe.

8. The device according to claim 7, wherein a position of the connecting part in the device is adjustable in a direction of a symmetry axis of the pipe and/or in a direction perpendicular thereto.

9. The device according to claim 8, further comprising means for rotating the connecting part around the symmetry axis of the pipe.

10. The device according to claim 9, wherein the rotation means includes a guide body, on which the fastening mechanism is arranged, wherein the connecting part is movable around the guide body along the edge.

11. The device according to claim 7, wherein the fastening mechanism comprises at least two clamping elements to provide support against the inside surface of the pipe.

12. The device according to claim 11, wherein the clamping elements each comprise at least one of the group consisting of a parallel guide linkage, a scissors type tensioner, a pivoting lever arm, a linear motor, and a lever arm for extending a support member.

13. The device according to claim 10, wherein the guide body is formed by a guide rod and/or a guide tube, a position of the guide rod relative to the guide tube being adjustable.

14. The device according to claim 7, wherein the device is configured to mount the roller on the pipe under tension.

15. The device according to claim 1, further comprising a hand-operated or motorized drive to move the connecting part along the edge.

16. The device according to claim 1, wherein the drive is provided to drive the at least one roller or a rotation means.

17. The device according to claim 1, further comprising an edge roller and/or a support surface arranged to support the device against the edge in a direction of a pipe axis.

18. The device according to claim 1, wherein a position of the milling and/or grinding head in the device is adjustable at least one of in a direction of a symmetry axis of the pipe, in a direction of a rotational axis of the milling head or of the grinding head, or perpendicular thereto.

19. A device for milling and/or grinding, comprising: a device according to claim 1; and a milling and/or grinding machine.

20. A device for holding a milling and/or grinding machine in a position for machining an edge at one end of a pipe, the device comprising: at least one rotatable roller placeable against an inside surface or an outside surface of the pipe; a connecting part on which the milling and/or grinding machine is mountable, the connecting part being movable along the edge by the rotatable roller; a mechanism for clamping the holding device to the inside surface of the pipe, wherein a distance between the roller and the clamping mechanism is changeable; and a spring provided to apply tension between the clamping mechanism and the roller so that the roller is mounted on the pipe under tension relative to the clamping mechanism, the clamping mechanism including at least two clamping elements provide against inside surface of the pipe.

* * * * *